(12) United States Patent
Charier et al.

(10) Patent No.: US 11,466,697 B2
(45) Date of Patent: Oct. 11, 2022

(54) FAN MODULE COMPRISING VARIABLE-PITCH BLADES

(71) Applicant: SAFRAN AIRCRAFT ENGINES, Paris (FR)

(72) Inventors: Gilles Alain Marie Charier, Moissy-Cramayel (FR); Olivier Formica, Moissy-Cramayel (FR); Caroline Marie Frantz, Moissy-Cramayel (FR); Nicolas Jerome Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/283,496

(22) PCT Filed: Oct. 10, 2019

(86) PCT No.: PCT/FR2019/052418
§ 371 (c)(1),
(2) Date: Apr. 7, 2021

(87) PCT Pub. No.: WO2020/074839
PCT Pub. Date: Apr. 16, 2020

(65) Prior Publication Data
US 2021/0396244 A1     Dec. 23, 2021

(30) Foreign Application Priority Data
Oct. 10, 2018  (FR) ....................... 1859405

(51) Int. Cl.
*F02C 7/36*     (2006.01)
*F04D 29/32*    (2006.01)
(Continued)

(52) U.S. Cl.
CPC ............ *F04D 29/323* (2013.01); *B64C 11/38* (2013.01); *F01D 7/00* (2013.01); *F01D 25/16* (2013.01);
(Continued)

(58) Field of Classification Search
CPC ...... F02C 7/36; B64C 11/38; B64C 11/30–44; F01D 7/00; F01D 25/16; F01D 25/162; F04D 29/323; F04D 29/056
See application file for complete search history.

(56) References Cited

U.S. PATENT DOCUMENTS 2,850,103 A * 9/1958 Pearl ...................... B64C 11/38
416/157 R
10,393,137 B2 * 8/2019 Niergarth ................ B64C 11/38
(Continued)

FOREIGN PATENT DOCUMENTS

EP     3179044 A1    6/2017
EP     3205576 A1    8/2017
(Continued)

OTHER PUBLICATIONS

International Search Report and Written Opinion received for PCT Patent Application No. PCT/FR2019/052418, dated Feb. 28, 2020, 18 pages (9 pages of English Translation and 9 pages of Original Document).

*Primary Examiner* — Richard A Edgar
*Assistant Examiner* — Behnoush Haghighian
(74) *Attorney, Agent, or Firm* — Womble Bond Dickinson (US) LLP

(57) ABSTRACT

A fan module including variable-pitch blades, a fan rotor bearing the blades of the fan, each mounted to pivot about a pitch axis; a fan shaft extending along a longitudinal axis X inside the fan rotor and driving the fan rotor in rotation. A power shaft drives the fan shaft with a planetary gear (Continued)

speed reducer At least a first and a second bearing guide the rotation of the fan rotor, housed inside a lubrication chamber. A system varies the pitch of the fan blades, including a connecting mechanism connected to the blades of the fan and a controller acting on the connecting mechanism. The first bearing is disposed upstream of the speed reducer and the second bearing is disposed downstream of the speed reducer. The fan rotor is connected to the fan shaft by an annular trunnion extending at least along an upstream portion of the lubrication chamber.

15 Claims, 3 Drawing Sheets

(51) Int. Cl.
    *B64C 11/38*     (2006.01)
    *F01D 7/00*      (2006.01)
    *F01D 25/16*     (2006.01)
    *F04D 29/056*    (2006.01)

(52) U.S. Cl.
    CPC .............. *F01D 25/162* (2013.01); *F02C 7/36* (2013.01); *F04D 29/056* (2013.01); *F05D 2220/36* (2013.01); *F05D 2260/40311* (2013.01); *F05D 2260/76* (2013.01); *F05D 2270/64* (2013.01)

(56) References Cited

U.S. PATENT DOCUMENTS

| | | | |
|---|---|---|---|
| 10,479,514 B2 * | 11/2019 | Mouton | B64C 11/38 |
| 10,584,641 B2 * | 3/2020 | Escure | F02C 7/36 |
| 11,052,994 B2 * | 7/2021 | Charier | B64C 11/306 |
| 11,221,017 B2 * | 1/2022 | Niergarth | F04D 29/36 |
| 2016/0076393 A1 | 3/2016 | Sheridan | |
| 2017/0234324 A1 * | 8/2017 | Niergarth | B64C 11/38 416/1 |
| 2020/0141421 A1 * | 5/2020 | Niergarth | B64C 11/38 |

FOREIGN PATENT DOCUMENTS

| | | |
|---|---|---|
| GB | 2209371 A | 5/1989 |
| WO | 2010/097440 A1 | 9/2010 |
| WO | 2010/108576 A2 | 9/2010 |

* cited by examiner

FAN MODULE COMPRISING VARIABLE-PITCH BLADES

1. TECHNICAL FIELD

The present invention relates to the field of the turbomachines. In particular, it relates to a fan module comprising variable-pitch blades.

2. BACKGROUND

The prior art comprises the patent documents EP-A1-3 205 576, GB-A-2 209 371, WO-A2-2010/108576, US-A1-2016/076393, WO-A1-2010/097440, and EP-A1-3 179 044.

A fan comprising blades with variable-pitch allows to adjust the blade pitch or blade orientation, and more specifically the blade pitch angle, according to the flight parameters so as to optimise the operation of the fan. In general, this configuration allows the optimisation of the fan module in which such a fan is integrated. As a reminder, the pitch angle of a blade is the angle, in a longitudinal plane perpendicular to the axis of rotation of the blade, between the chord of the blade and the plane of rotation of the fan. The variable-pitch blades can occupy a reverse thrust position in which they generate counter-thrust to help slow the aircraft down, and a feathered position in which, in the event of failure or breakdown, they limit their resistance.

The search for the best propulsive efficiency leads to the consideration of fans with a lower and lower nominal compression ratio, and consequently with a larger and larger external diameter. Such choices lead to increase operability constraints on the fan vanes between ground and flight operating conditions. An effective way to address these constraints has been to consider fan vanes with a variable pitch. In addition, the drive of this fan module with a large diameter and a low pressure ratio (generally less than 1.3) is made possible in particular by a speed reducer which allows a power shaft of the turbomachine to drive the fan shaft and which allows the rotational speed of the fan shaft to be reduced relative to the power shaft. Typically at least two bearings are mounted in an annular lubrication space upstream of the speed reducer, to support the diameter of the fan and the speed reducer on one hand and, on the other hand, to allow the integration of a system for varying the pitch of the blades of the fan. The annular lubrication enclosure extending below the fan rotor also lubricates the speed reducer and at least partially encloses the pitch-varying system and the bearings.

However, this arrangement is still bulky and has a negative impact on the mass of the fan module as well as on the performances of the turbomachine. In particular, the pitch-varying system, the speed reducer and the bearings, all arranged in the annular enclosure, generate an axial and a radial dimensions under the pivot axis of the blades. Such an increase in the mass affects the frequency position of the bending deformation mode of the fan relative to the maximum rotational speed of the fan depending on the operation of the turbomachine. The frequency of this bending deformation mode tends to shift towards the lower frequencies and closer to the maximum operating speed, leading to increase loads and dynamic clearance consumption in the presence of an unbalance at the fan. This leads to a negative impact in terms of mass (required to support the increased design loads) and performance (due to increased dynamic clearance consumption). When an unbalance occurs on the fan shaft, for example, the vibrations can also be transmitted to the power shaft via the reducer.

Also, during operation of the turbomachine, misalignments occur between the power and the fan shafts which are transmitted to the components of the speed reducer. In the case of an epicyclic gear speed reducer (which comprises an inner planetary gear (or sun gear), planet gears, a planet carrier and a ring gear (or outer planetary gear), the misalignments, in particular the dynamic misalignments (which are caused by unbalances at the fan or at the power shaft) occur at the input shaft (which is connected to the power shaft of the turbomachine), the planet carrier and the ring gear, which must be managed by modifying these components or adding parts to modify their behaviour.

3. OBJECTIVE OF THE INVENTION

The present invention has, in particular, the objective of providing a fan module which allows the radial and axial dimensions to be improved in a simple and effective manner so as to improve the mass of the module and its dynamic situation while avoiding major structural modifications.

4. DESCRIPTION OF THE INVENTION

This is achieved in accordance with the invention by means of a fan module comprising variable-pitch blades, said fan module comprising:
- a fan rotor carrying the blades of the fan each mounted to pivot about a pitch axis,
- a fan shaft extending along a longitudinal axis X inside the fan rotor and driving the fan rotor in rotation,
- a power shaft driving the fan shaft in rotation by means of an epicyclic gear speed reducer,
- at least a first and a second bearings for guiding the rotation of the fan rotor relative to a fixed structure of the fan module and housed inside a lubrication enclosure,
- a pitch-varying system for varying the pitch of the blades of the fan comprising a connecting mechanism connected to the blades of the fan and a control means acting on the connecting mechanism, the first bearing being disposed upstream of the speed reducer and the second bearing being disposed downstream of the speed reducer, the fan rotor being connected to the fan shaft by means of an annular trunnion extending at least along an upstream part of the lubrication enclosure, and the control means being located axially upstream of the trunnion.

Thus, this solution allows to achieve the above objective. In particular, the configuration of the trunnion in relation to the fan rotor supporting the blades and of the lubrication enclosure upstream of the fan shaft, and of the bearings in relation to the speed reducer, allows to reduce, on the one hand, the axial dimensions and, on the other hand, the radial dimensions in the fan rotor. The fan rotor and the pitch axis of the blades can be placed as close as possible to the fan bearings, which also improves the dynamic behaviour of the fan module (reduction of the overhang mass on these bearings). The bearings upstream and downstream of the speed reducer facilitate the integration of the pitch-varying system and in particular of the control means which have more axial space.

The fan module also comprises one or more of the following characteristics, considered alone or in combination:
- the annular trunnion extends below the roots of the blades along a radial axis,
- the annular trunnion comprises an upstream end located axially at the level of the pitch axis of the blades and extends downstream of the pitch axis of the blades, the fan rotor comprises a support ring comprising radial cylindrical housings distributed regularly around the longitudinal axis and intended to receive each a blade root, the trunnion being fixed downstream of the support ring, the trunnion is an attached element fixed to the fan shaft, the control means is arranged upstream of a radial plane in which the pitch axes of the blades are defined, the control means is rotationally secured with the fan shaft, the control means comprises a fixed body and a movable body that is movable in translation along the longitudinal axis X with respect to said fixed body, the movable body being connected to the connecting mechanism, the control means comprises a fixed body and a movable body which is arranged around the fixed body and which is coaxial with the longitudinal axis, the speed reducer comprises a sun gear coupled to the power shaft, planet gears and a planet carrier which carries the planet gears and which is coupled to the fan shaft, the fan shaft and the planet carrier are integral, the fan module comprises supplying means for supplying the control means connected to a power source, the supplying means comprising pipes which pass through the speed reducer and extend at least in part inside the fan shaft, the speed reducer comprises through-openings which are provided in the planet carrier so as to allow the passage of the pipes, each through-opening being arranged between two adjacent planet gears, the supplying means are coupled to an oil transfer bearing arranged downstream of the speed reducer, the first bearing comprises two ball bearings or one roller bearing and one ball bearing, the first bearing is a ball bearing, the second bearing is a roller bearing, the reducer comprises a number n of planet gears, n being equal to or greater than three, the speed reducer is housed inside the lubrication enclosure, the connecting means comprise connecting rods, each with a first end articulated to a clevis of a ring secured with the movable body of the control means and a second end articulated to a crankpin of the blade root, the fan module comprises an upstream fan and a downstream fan, the upstream fan is mounted so as to be rotatable about the longitudinal axis and the downstream fan is mounted so as to be fixed with respect to the upstream fan, at least one fan is ducted, the oil transfer bearing is in fluid communication with the pipes of the supplying means, the first and second guide bearings are supported by the fan shaft upstream and downstream of the speed reducer, the first bearing comprises an inner ring connected to the fan shaft and an outer ring connected to an upstream bearing support, and rolling elements between the inner and outer rings, the second bearing comprises an inner ring connected to a cover and an outer ring connected to a downstream bearing support, and rolling elements between the inner ring and the outer ring, the blade pitch axis is perpendicular to the longitudinal axis.

The invention also relates to a turbomachine comprising at least one fan module having any of the above characteristics.

5. DESCRIPTION OF FIGURES

The invention will be better understood, and other purposes, details, characteristics and advantages thereof will become clearer on reading the following detailed explanatory description of embodiments of the invention given as purely illustrative and non-limiting examples, with reference to the appended schematic drawings in which.

6. DESCRIPTION OF EMBODIMENTS OF THE INVENTION

Figure 1:
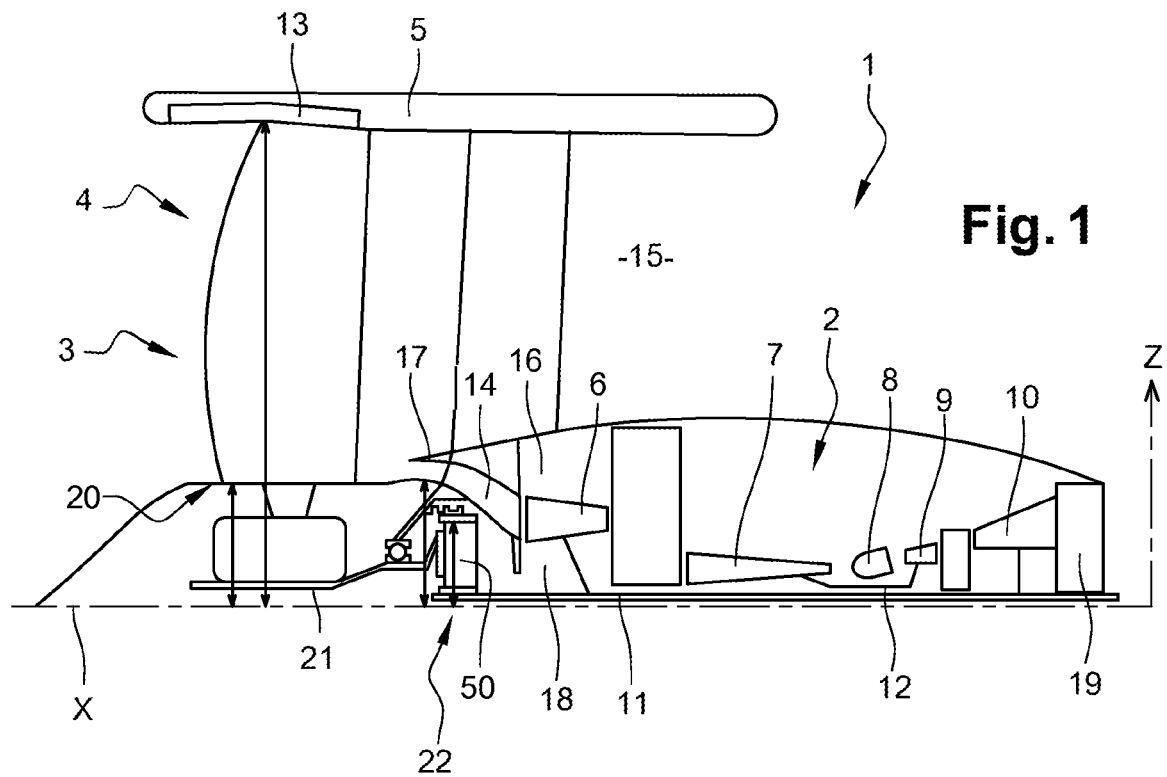
FIG. 1 shows an axial section of a turbomachine to which the invention applies.

FIG. 1 shows a turbomachine 1 intended to be mounted on an aircraft. This turbomachine 1 is here a dual flow turbomachine which extends along a longitudinal axis X. Of course, the invention can be applied to other types of turbomachines comprising at least one fan as will be seen in the remainder of the description.

In general, and in the remainder of the description, the term "fan" is used to designate either a fan or a propeller, the blades of the fan or of the propeller being able to be ducted (for example for turbojet engines) or not ducted (for example for turboprop engines).

The turbomachine 1 comprises a gas generator 2 upstream of which is mounted a fan module 3 with at least one fan 4. In the present invention, and in general, the terms "upstream" and "downstream" are defined with respect to the gas flow in the turbomachine which is substantially parallel to the longitudinal axis X. Similarly, the terms "internal", "external", "above", "below", "radial" and "radially" are defined with respect to the radial axis Z perpendicular to the longitudinal axis X and with respect to the distance from the longitudinal axis X. Finally, the terms "axial" and "axially" are defined with respect to the longitudinal axis.

The turbomachine 1 comprises an external nacelle 5 enclosing the gas generator 2. The gas generator 2 comprises, for example, from upstream to downstream, a low-pressure compressor 6, a high-pressure compressor 7, a combustion chamber 8, a high-pressure turbine 9 and a low-pressure turbine 10. The low pressure compressor 6 and the low pressure turbine 10 each comprise a rotor, with a low-pressure shaft 11 connecting the rotors to form a low-pressure body. Similarly, the high-pressure compressor 7 and the high-pressure turbine 9 each comprise a rotor, with a high-pressure shaft 12 connecting the rotors to form a high-pressure body.

The fan 4 is housed in a fan casing 13 which is secured with the nacelle 5. The fan 4 compresses a flow of air entering the turbomachine, which is divided into a primary air flow circulating in an annular primary vein 14 which passes through the gas generator and a secondary air flow circulating in an annular secondary vein 15 around the gas generator. In particular, the primary vein 14 and the secondary vein 15 are separated by an annular inter-vein casing 16 surrounding the gas generator. The inter-vein casing 16 comprises upstream of it a separation nozzle 17 which divides the incoming air flow into a primary air flow and a secondary air flow. In particular, the primary vein 14 is radially delimited by an annular inner casing 18 and the annular inter-vein casing 17. As for the secondary vein 15, it is radially delimited by the inter-vein casing 16 and the nacelle 5.

The turbomachine 1 also comprises an ejection nozzle 19 located downstream of the gas generator 2 through which the primary air flow and secondary air flow are ejected outside the turbomachine, and in particular into the atmosphere.

The fan module 3 comprises a fan rotor 20 through which an annular fan shaft 21 passes, centred on the longitudinal axis X. The fan shaft 21 drives in rotation the fan rotor 20 about the longitudinal axis. The fan shaft 21 is itself rotated by a power transmission shaft of longitudinal axis X by means of a power transmission mechanism 22. In the present example, the power transmission shaft is the low-pressure shaft 11. Alternatively, the power shaft is a power turbine shaft supplied with gas from the gas generator. The power transmission mechanism 22 allows the rotational speed of the fan shaft to be reduced relative to the speed of the low-pressure shaft. On the other hand, the power transmission mechanism 22 allows the arrangement of a fan with a large diameter so as to increase the dilution ratio. In the present example, the dilution ratio of the fan is greater than 10. Preferably, the dilution ratio is between 15 and 20. For this purpose, the diameter of the fan is greater than 250 cm.

Figure 2:
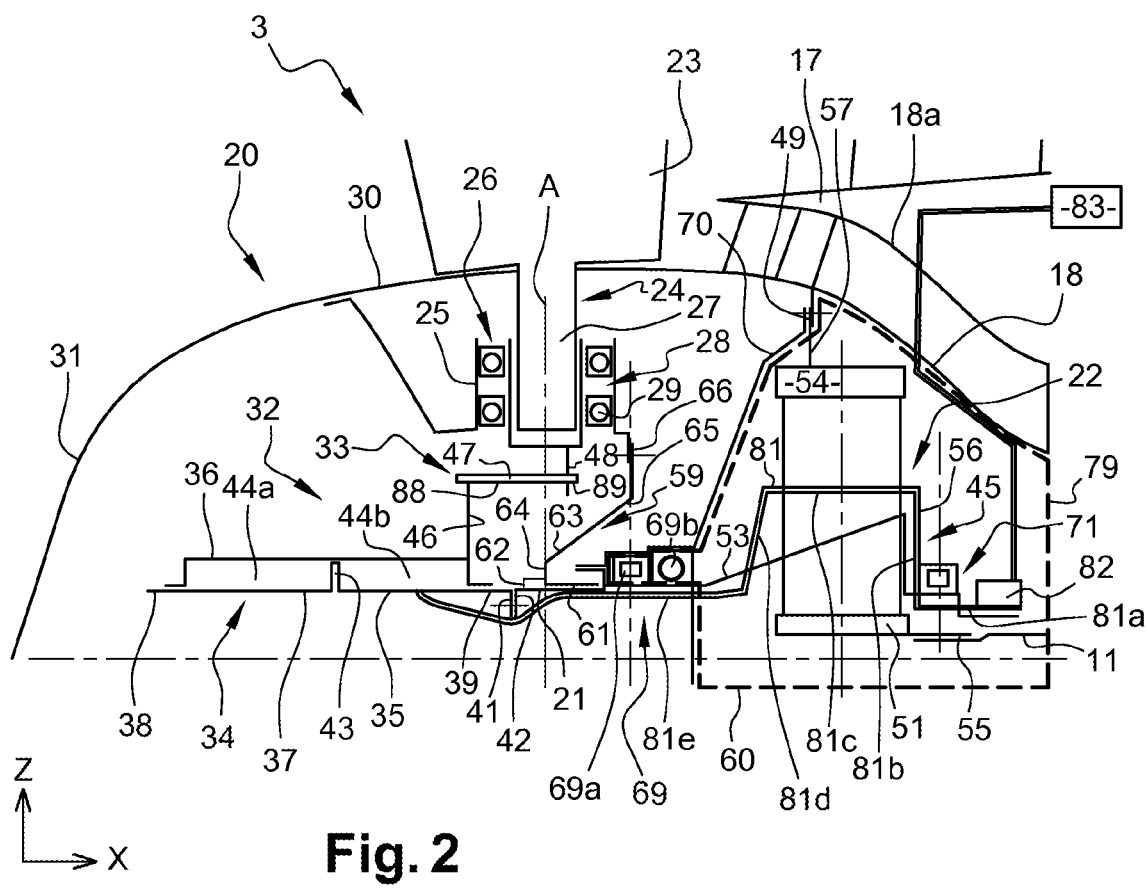
FIG. 2 shows schematically an axial section detailed view of a fan module of a turbomachine according to the invention.

With reference to FIG. 2, the fan rotor 20 carries a series of blades 23 which are with variable pitch. To this end, the blades 23 each comprise a root 24 and the blades 23 extend radially outwards from their roots 24. The free end of the blades is bounded radially by the fan casing 13. More specifically, the fan rotor 20 comprises a support ring 25 centred on the longitudinal axis X. The support ring 25 comprises a plurality of radial cylindrical housings 26 which are evenly distributed around its periphery. The housings 26 each receive, in a pivoting manner along a pitch axis A, a blade root 24. The pitch axis A is parallel to the radial axis. Typically, each blade root 24 is in the form of a bulbous attachment which is secured with a pivot 27 which is mounted in a housing 26. Each root 24 is pivoted in a cylindrical housing 26 by means of a guide bearing 28. Here, there are two guide bearings in each housing 26. These bearings each comprise bearings and are mounted one above the other along the radial axis Z. In particular, each bearing 28 comprises an inner ring and an outer ring between which rolling elements are arranged. Each inner ring is connected to the root 24 and each outer ring is connected to the wall of the cylindrical housing 26. The rolling elements of these two bearings 28 comprise balls 29 respectively.

As can also be seen in FIG. 2, the roots 24 of the blades are covered by an outer annular shroud 30 which is centred on the longitudinal axis X and which extends downstream an inlet cone 31 of the fan so as to ensure aerodynamic continuity with the cone 31. The latter guides the incoming airflow towards the blades 23 of the fan.

The fan module 3 also comprises a pitch-varying system 32 for varying the pitch of the blades of the fan 4, which allows the pitch of the blades to be varied about their radial pitch axes A so that they can have different angular positions depending on the operating conditions of the turbomachine and the phases of flight concerned. To this end, the pitch-varying system 32 comprises connecting means 33 connected to the blades 23 of the fan and a control means 34 acting on the connecting means 33.

In the present example, the control means 34 is rotationally secured to the fan shaft 21. In order to reduce the overall dimensions in the fan module, the control means 34 is disposed upstream of the fan shaft 21. In particular, the control means 34 is arranged upstream of a radial plane in which the pitch axes of the blades of the fan are defined. Advantageously, but not restrictively, the control means 34 comprises an annular linear actuator with an axis coaxial with the longitudinal axis X. The linear actuator comprises a fixed body 35 rotationally secured to the fan shaft and a movable body 36 in translation relative to the fixed body 35 along the longitudinal axis X. The mass of the pitch-varying system is thus better distributed (as it has a reduced overhang relative to the bearings 69a, 69b of the fan rotor described later in the description), which improves the dynamic behaviour of the fan rotor. The movement of the movable body 36 along the longitudinal axis causes the movement of the connecting means 33, described later in the description, in such a way that this causes the blades 23 of the fan to pivot about the pitch axis A and thereby the pitch of the blades 23.

The fixed body 35 is cylindrical, with a longitudinal axis X and a circular cross section. The fixed body 35 comprises an annular wall 37 with a first end 38 and a second end 39 which are opposite along the longitudinal axis. The wall 37 is attached to an upstream end 40 of the fan shaft. For this purpose, the wall 37 comprises a first annular flange 41 extending radially from the second end 39. Advantageously, the first annular flange 41 extends inside the fixed body 35. This first annular flange is attached to a second annular flange 42 of the fan shaft 21 to allow the fixed body to be attached to the fan shaft.

The fixed body 35 also comprises a radial wall 43 bounding here two chambers 44a, 44b of variable volume in the movable body 36 and which are axially opposed. The wall 43 extends from a radially outer face of the wall 37 outwards. The movable body 36 is arranged around the fixed body 35 and is coaxial with the longitudinal axis. It moves axially under the action of a control from the control means 34. For this purpose, the pitch-varying system comprises fluid supplying means 45 ensuring the control of the latter.

The chambers 44a, 44b are intended to receive a fluid, for example hydraulic fluid under pressure, from a fluid power source 83 so that the movable body 36 occupies at least two positions. These positions correspond respectively to the reverse thrust position and the fan blade feathering position. In particular, in the reverse thrust position, the fan blades participate in the braking of the aircraft, in the manner of conventional thrust reversers. In the feathered position, the blades 23 are then set back as far as possible from the direction of forward motion of the aircraft, for example in the event of a turbomachine failure, thereby limiting drag. In the latter position, the blade pitch angle is positive, and is generally around 90°. In the present example, when the movable body 36 is upstream of the control means (close to the fan shaft) then the blades are in the feathered position and when the movable body is downstream of the control means 34 (towards the end 39), then the blades are in the reverse thrust position.

Figure 3:
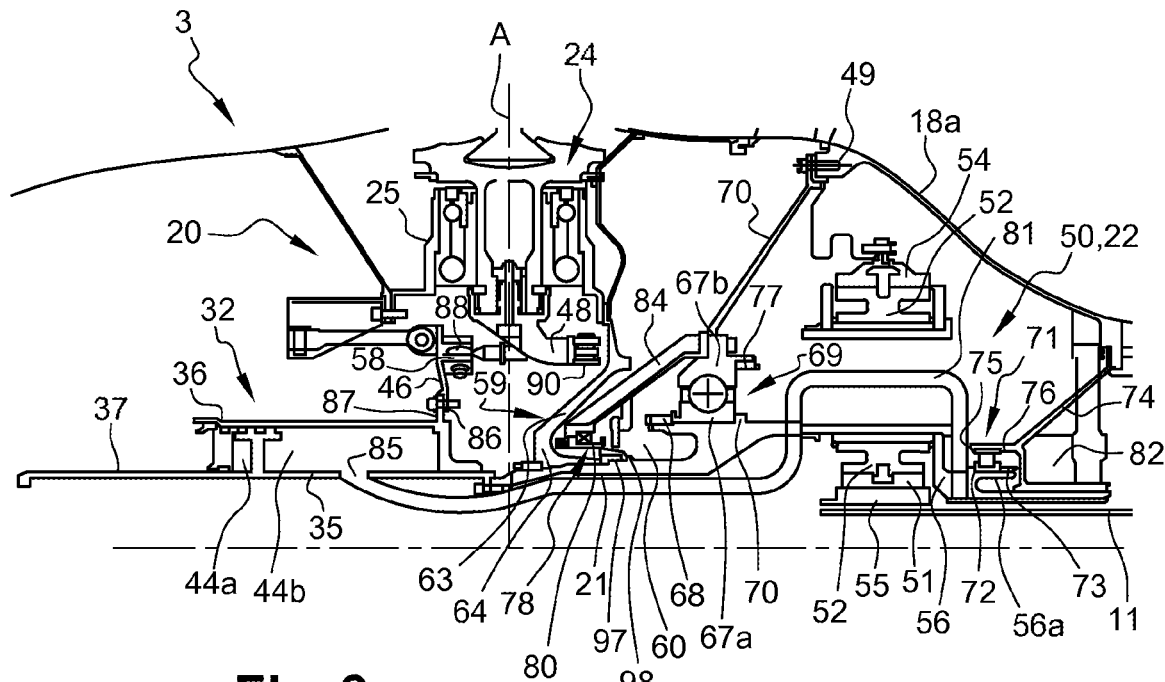
FIG. 3 illustrates another embodiment of a fan module of a turbomachine according to the invention.

With reference to FIGS. 2 and 3, the pitch-varying system 32 further comprises a synchronisation ring 46 which is driven in translation, axially, by the control means. The synchronisation ring 46 is secured on the one hand with the movable body 36 and on the other hand with the connecting means 33. The synchronisation ring 46 allows the displacement of the movable body to cause the pivoting of all the blades. This synchronisation ring comprises a first radial annular flange 86 which is fixed to a second radial annular flange 87 carried by the movable body 36. More specifically, the second radial annular flange 87 is located at an upstream end of the movable body 36. The synchronisation ring 46 comprises a plurality of clevises 58 evenly and circumferentially distributed around the longitudinal axis. Each clevis 58 cooperates with a connecting rod 47 of the connecting means 33.

In this example, the connecting means 33 comprise several connecting rods 47. The connecting rods 47 are disposed around the actuator. There are as many connecting rods as there are blades 23. Each connecting rod 47 comprises a first end 88 and a second end 89 opposite each other along the direction of elongation of the connecting rod 47. The direction of elongation is here substantially parallel to the longitudinal axis (in the installation situation). The first end 88 is articulated in a clevis 58 of the synchronisation ring 46 while the second end 89 is connected to a fork 90 which is carried by a crankpin 48 of a blade root. Each crankpin 48 is located at a radially inner end of the blade root 23. The crankpin 48 allows the force required to adjust the pitch of the corresponding blade to be multiplied. In this way, the translational movement of the movable body 36 is transmitted to each blade.

Preferably, but not restrictively, the actuator is an annular hydraulic cylinder. The cylinder comprises its fixed rod secured with the fan shaft and a cylinder movable relative to the rod. The rod is formed by the fixed body 35 while the cylinder is formed by the movable body 36.

With reference to FIGS. 2, 3 and 5 to 7, the power transmission mechanism 22 comprises a speed reducer 50. Preferably, but not restrictively, the speed reducer is an epicyclic gear train. This latter is housed in a lubrication enclosure 60 (shown schematically as a dotted line in FIG. 2) in which it is lubricated. Typically, the speed reducer 50 comprises an inner planetary gear 51 (or sun gear), planet gears 52, a planet carrier 53 and an outer ring gear 54 (outer planetary gear). In the present example, the sun gear 51 is centred on the longitudinal axis X and is rotationally coupled with the power shaft (here the low-pressure shaft 11) along the longitudinal axis X via a planetary shaft 55. The latter comprises first elements intended to cooperate with second complementary coupling elements carried by the sun gear 51. The planet gears 52 are carried by the planet carrier 53 and each rotate about an axis substantially parallel to the longitudinal axis X. Each of the planet gears 52 meshes with the sun gear 51 and the outer ring gear 54. The planet gears 52 are disposed radially between the sun gear and the ring gear. In the present example, three planet gears 52 are provided. Of course, the speed reducer 50 may comprise a number of planet gears greater than three.

The planet carrier 53 is rotationally coupled to the fan shaft 21. In this way, the sun gear forms the input of the speed reducer while the planet carrier forms the output of the speed reducer. The fan shaft, the planetary shaft and the power shaft rotate about the longitudinal axis and are coaxial. In this example of embodiment, the planet carrier 53 and the fan shaft 21 are integral. In other words, they are formed in one piece or from one material.

Figure 5:
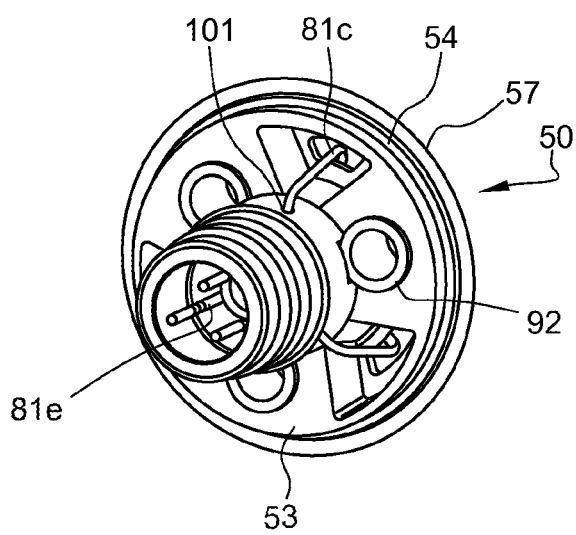
FIG. 5 is a perspective view from an upstream side of an example of a speed reducer mounted inside a turbomachine with a fan module according to the invention.
Figure 6:
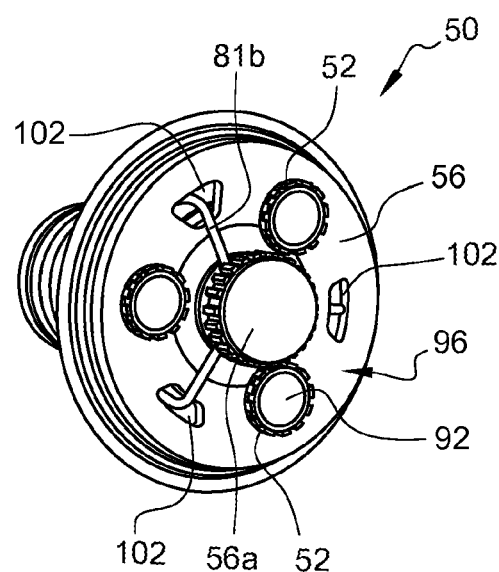
FIG. 6 is a perspective view from a downstream side of the speed reducer shown in FIG. 5.
Figure 7:
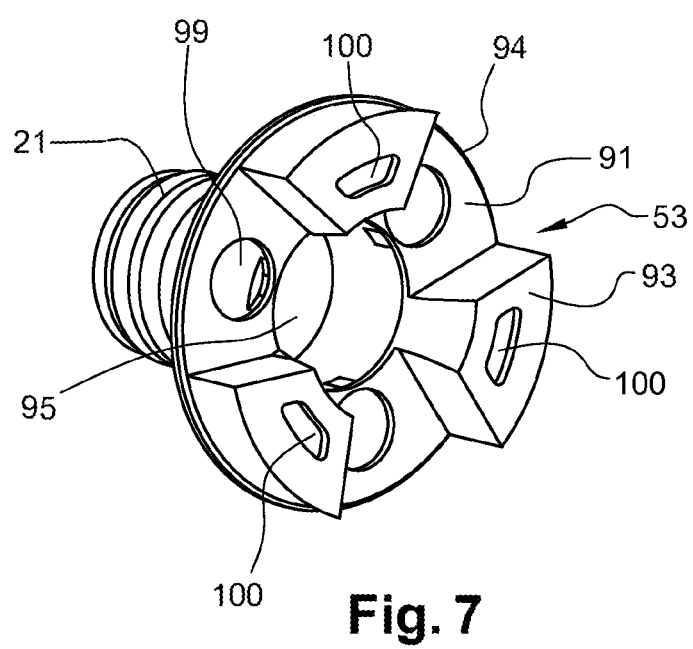
FIG. 7 is a perspective view of an example of a planet carrier of the speed reducer illustrated in FIGS. 5 and 6.

With reference to FIGS. 5 to 7, the planet carrier 53 advantageously comprises, but is not limited to, a disc 91 defined in a radial plane (perpendicular to the longitudinal axis X). The planet carrier 53 comprises planet gear shafts 92 which extend in protrusion from the disc 91 along the longitudinal axis. Each planet gear 52 is mounted on a planet gear shaft 92 which is mounted in an opening 99 formed in the disc. The planet carrier 53 further comprises projecting journals 93 along the longitudinal axis. These projecting journals 93 extend circumferentially between the planet gear shafts 92. The projecting journals 93 form cavities therebetween and circumferentially allowing to each receive the planet gears. The openings 99 are located in the bottom of the cavities formed by a part of the wall of the disc 91. In addition, the projecting journals 93 extend radially between the periphery 94 of the disc and a central hole 95 centred on the longitudinal axis to accommodate the sun gear 51. This helps to hold the planet gears and prevent misalignment.

The speed reducer 50 further comprises a cover 56 which is positioned on the downstream side thereof. In particular, the cover 56 is fixed to the planet carrier 53 so as to hold the axles of the planet gears. The cover 56 is thus made rotationally secured with the planet carrier and the fan shaft. The cover 56 comprises a wall 96 in the form of a disc and a shaft 56*a* extending axially from the wall, in particular from its centre. The wall of the cover is in abutment against the radial surfaces of the projecting journals 93 of the planet carrier 53.

The ring gear 54 surrounds the planet carrier 53 and is centred on the longitudinal axis. Similarly, it is fixed with respect to the planet carrier 53. In particular, the ring gear 54 is attached to a fixed structure of the turbomachine via a support shell 57. In the present example, the fixed structure is rigidly attached to the inner casing 18 of the turbomachine. As can be seen in FIG. 2, the speed reducer 50 is located downstream of the separation nozzle 17 of the inter-vein casing.

With reference to FIG. 2, the fan shaft 21 is connected to the fan rotor by means of an annular trunnion 59. The latter extends over at least a part of the lubrication enclosure 60 which is arranged upstream of the speed reducer 50. The trunnion 59 has a generally pinhead-shaped axial cross-section with the fan shaft 21. Such a shape allows to reduce the radial dimensions because the support ring 25 for supporting the blades can be positioned as close as possible to the fan shaft 21. As illustrated, the trunnion 59 extends radially below the roots of the fan blades. The trunnion 59 is attached upstream of the fan shaft 21 and downstream of the support ring 25 carrying the fan blades.

In particular, the trunnion 59 comprises an annular skirt 61 with a longitudinal axis. This skirt 61 is mounted on the fan shaft towards the upstream end 40 thereof, the skirt 61 surrounding the fan shaft. Advantageously, but not restrictively, the skirt 61 is held on the fan shaft 21 by means of a first holding member 62 mounted upstream of the skirt 61. This first holding member 62 may be a nut. In other words, the trunnion is an element attached and fixed to the fan shaft. The trunnion 59 comprises a central portion 63 which has a frustoconical axial section shape. The central portion 63 comprises an upstream end 64 which is connected to a first end of the skirt 61. The latter extends inside the central portion 63. The central portion 63 further comprises a downstream end 65 which is connected to an annular collar 66 which extends along the radial axis. The collar 66 enables the trunnion 59 to be attached to the fan rotor. More specifically, the collar 66 is attached to a downstream side of the support ring 25 for supporting the fan blades. The central portion 63 partially covers the lubrication enclosure 60.

The upstream end 64 of the trunnion 59 (in particular of the central portion) is located axially at the level of the pitch axis A of the fan blades. The trunnion 59 itself extends downstream of the pitch axis A of the fan blades. Specifically, we can see from FIG. 2 that the central portion 63 and the collar 66 are downstream of the pitch axis of the fan blades. We understand that the control means 34 is located axially upstream of the trunnion.

The lubrication enclosure 60 allows to lubricate at least a first bearing 69 for guiding in rotation the fan shaft 21. The first bearing 69 is arranged upstream of the speed reducer 50. The first bearing 69 is a rolling bearing. It comprises an annular inner ring and an annular outer ring facing each other. Rolling elements are disposed between the inner and the outer rings which define rolling tracks. The inner ring is carried by the fan shaft 21. The outer ring is carried by an upstream bearing support 70. The upstream bearing support 70 is rigidly attached to the fixed structure 49, which is attached to the inner casing 18.

With reference to FIG. 2, the first bearing 69 is a double bearing. In other words, there are two first bearings, a first upstream bearing 69a and a first downstream bearing 69b, which are located upstream of the speed reducer 50 to guide the fan shaft in rotation relative to the fixed structure of the turbomachine. In this case, the rolling elements of one of the first upstream and downstream bearings are balls and the rolling elements of the other of the first upstream and downstream bearings are rollers. Preferably, but not exclusively, the roller bearing is arranged upstream of the ball bearing. Alternatively, the first upstream and downstream bearings 69a, 69b comprise two ball bearings. These bearings allow axial and radial loads to be supported. The inner rings of the first upstream and downstream bearings are mounted side by side. Typically, the inner ring of the first downstream bearing 69b is blocked axially downstream by a shoulder (not shown). The inner ring of the first upstream bearing is locked axially upstream by a holding member such as a nut. The outer ring of the first downstream bearing is blocked axially upstream by a shoulder and downstream by a holding member (a nut) on the upstream bearing support 70. The inner ring of the first upstream bearing is axially blocked upstream by an axial stop element such as a ring (not shown) and downstream by a shoulder. Preferably, but not restrictively, the outer diameter of the first downstream bearing 69b is greater than the outer diameter of the first upstream bearing 69a.

In another embodiment illustrated in FIG. 3, there is a single first bearing 69 located upstream of the speed reducer 50. The rolling elements of this guide bearing are balls. In this case, the inner ring 67a of the first bearing 69 is blocked axially, on the one hand by an axial holding member 68 upstream, and on the other hand by a shoulder 70 arranged downstream of it. The axial holding member 68 is here a nut. The outer ring 67b is blocked axially upstream by a shoulder and downstream by a holding member 77 such as a nut.

The fan shaft 21 is also guided in rotation by means of a second guide bearing 71 (shown in FIGS. 2 and 3) located downstream of the speed reducer 50. The second guide bearing is also housed inside the lubrication enclosure 60. The arrangement of a first bearing 69 and a second bearing 71 respectively upstream and downstream of the speed reducer 50 allows a gain in axial dimensions so as to facilitate the integration of the control means 34. The holding of the speed reducer is also improved with these bearings distributed upstream and downstream and the relative displacements of its various components are limited.

This second guide bearing 71 is a rolling bearing. The second guide bearing comprises an inner ring and an outer ring radially opposed. These define rolling tracks for rolling elements disposed between them. The inner ring is carried by the cover 56. More precisely, the inner ring is housed in a radially outer surface of the shaft 56a of the cover 56 as can be seen in FIG. 3. An axial locking of the inner ring is achieved upstream by a shoulder 72 and downstream by an axial holding member 73 such as a nut. As for the outer ring, it is carried by a downstream bearing support 74 which is rigidly fixed to a fixed structure of the turbomachine. The outer ring is blocked axially upstream by an axial stop element 75 such as a ring and downstream by a shoulder 76 (see FIG. 3). The rolling elements of this second guide bearing are advantageously cylindrical rollers. The latter advantageously allow radial loads to be supported.

The first and second guide bearings 69, 71 of the fan shaft 21 as well as the speed reducer 50 can be lubricated in the lubrication enclosure 60. Advantageously, the lubricant is oil which occupies the lubrication enclosure as a mist. The lubrication enclosure is delimited upstream by the upstream bearing support 70 and the fan shaft 21. Sealing means 78 are provided between the fan shaft 18 and the upstream bearing support 70 so as to prevent leakage of lubricant outside the lubrication enclosure. The sealing means 78 also delimit the lubrication enclosure 60. In particular, the sealing means 78 forms the upstream end of the lubrication enclosure 60. These are, for example, at least one labyrinth seal and/or at least one segmented radial seal (which may be a segmented carbon ring). The upstream bearing support 70 may be supplemented by pressurising means (not shown) for delivering a flow of pressurized air into the lubrication enclosure 60 via the sealing means 78. This pressurising means may comprise a channel formed in a cover 84 of the upstream bearing support 70 which is extended upstream thereof. Advantageously, the pressurisation air is taken from one of the compressors of the turbomachine. This arrangement allows possible to limit lubricant leaks.

In the embodiment shown in FIG. 3, the sealing means 78 are located upstream of the first guide bearing 69. The cover 84 of the upstream bearing support supports and partially covers this sealing means 78. Similarly, the trunnion radially surrounds the sealing means 78 on the outside.

Downstream, the lubrication enclosure 60 is bounded by an annular casing 79 attached to the inner casing and by a portion of the power shaft. A portion 18a of the inner casing 18 also bounds the lubrication enclosure 60. The portion 18a of the inner casing extends axially between the upstream bearing support 70 and the annular casing 79. The latter is located downstream of the downstream bearing support 74.

A deflector 80 (shown in FIG. 3) is mounted in the lubrication enclosure 60 to guide the lubricant (in this case oil) from one member to the other. This deflector 80 in the context of FIG. 3 is arranged axially between a nut 97 of upstream deflector 80 (mounted on the fan shaft 21) and a shoulder 98 of the fan shaft. In the context of FIG. 2, the deflector 80 is mounted axially between the deflector nut and the inner ring of the first guide bearing 69.

The fluid supplying means 45 of the control means are configured to be connected to the fluid power source 83 and to supply the chambers 44a, 44b of the control means. In FIGS. 2 and 3, the supplying means comprise at least one pipe which passes through the speed reducer 50. In this example of embodiment, several pipes 81 (here three) allow to supply the control means 34. These pipes 81 are advantageously high-pressure pipes. The pressure circulating in each pipe is of the order of 120 bar. The high-pressure fluid which circulates in the pipes 81 is advantageously an oil. For this purpose, an oil transfer bearing 82, which is known by the acronym "OTB", is arranged downstream of the speed reducer 50. This is made possible by the fact that the control means 34 is located upstream of the fan shaft and that the fixed body 35 is secured with the fan shaft rotating about the longitudinal axis X. The oil transfer bearing 82 allows, as its name indicates, the transfer of a fluid (oil) from the power source 83 which is placed downstream of the speed reducer 50, in a fixed reference frame of the turbomachine, towards the upstream of the speed reducer in order to supply the speed reducer but also the actuator which is placed in a rotating reference frame. Similarly, placing the oil transfer bearing 82 downstream of the speed reducer 50 allows to reduce the diameter of the speed reducer, to reduce the risk of leakage from the speed reducer, and to limit the thermal power of the speed reducer.

The oil transfer bearing 82 which is schematically represented in FIGS. 2 and 3 comprises a radially internal annular part (not shown) which is mounted secured in rotation with the planet carrier 53 (on the downstream side). In particular, this first part is fixed to the shaft of the cover. The oil transfer bearing also comprises a radially outer annular part which is secured to the fixed structure of the turbomachine. The lubricating fluid flows between the radially inner and outer parts. The oil transfer bearing is coupled at its upstream end to the pipes 81 (in this case three) which will be convey through the speed reducer 50 to the control means 34. Such a configuration allows, on the one hand, to reduce the radial dimensions of the fan module and to gain in compactness (and therefore in mass), and on the other hand, to reduce the overhang of the centre of gravity of the fan module with respect to the bearings which support it in order to improve the dynamic behaviour of the fan rotor.

To this end, as can be seen in FIGS. 5 to 7, the speed reducer 50 comprises through-openings 100 through which the pipes 81 pass. The through-openings 100 are provided at the projecting journals 93 of the planet carrier 53 and recessed into the projecting journals 93. In the present example, the through-openings 100 extend on both sides axially of the projecting journals 93 to open on an upstream side of the disc 91 of the speed reducer. In this case, the fan shaft 21 comprises radial openings 101, each of which is intended to be traversed by a pipe 81.

Alternatively, the through-openings 100 of the projecting journals 93 open into the interior of the fan shaft. In this case, each through-opening 100 has an inclined direction so that it opens into the interior of the fan shaft.

Each projecting journals 93 comprises a single through-opening. In this way, each through-opening is arranged between two adjacent planet gears. Similarly, the cover 56 of the planet carrier 53 comprises through holes 102 which pass through the wall 96 of the disc on both sides. When the cover 56 is mounted on the planet carrier 53, the through holes 102 and the through-openings 100 are aligned. Advantageously, the through-openings 100 and the through holes 102 are elongated in a circumferential direction. The radial cross-section of the through holes and the through-openings may be oblong or rectangular. Of course, the openings and the through holes may have a circular radial cross-section as long as they allow the passage of the pipes 81.

In this way, each pipe 81 extends at least partially inside the fan shaft 21. As can be seen in FIGS. 2, 3 and 5 to 7, the pipes 81 each comprise, from downstream to upstream, a first portion 81a which extends axially upstream of the speed reducer, a second portion 81b which extends radially upstream of the speed reducer (in particular of the cover 56) a third portion 81c which extends substantially axially inside the speed reducer (into the through-openings of the planet carrier and the through holes of the cover), a fourth portion 81d which extends substantially radially upstream of the speed reducer and a fifth portion 81e which extends axially inside the fan shaft. Each pipe 81 is also connected to the actuator chambers 44a, 44b via an orifice 85 (see FIG. 3) which opens into them.

Figure 4:
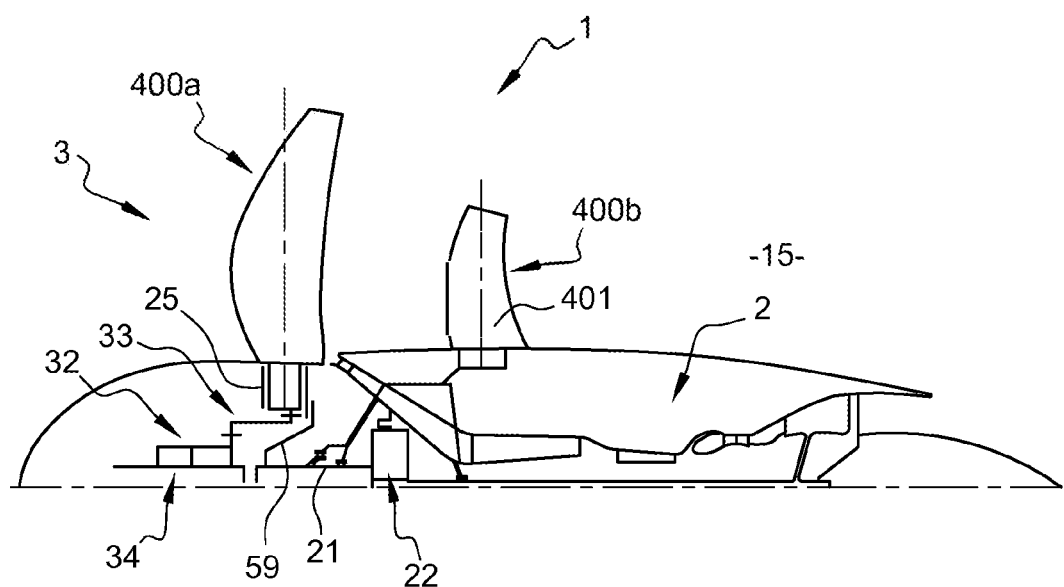
FIG. 4 is an axial section view of another embodiment of a turbomachine comprising a fan module according to the invention.

FIG. 4 shows another type of turbomachine to which the invention applies. The corresponding numerical references of the elements of the turbomachine described above are retained in the following description. This turbomachine comprises a fan module 3 with an upstream fan 400a and a downstream fan 400b. The upstream fan 400a is arranged substantially in the same manner as described above. That is, the upstream fan 400a is rotatable by means of a fan rotor and comprises variable-pitch blades. The pitch-varying system 32 is installed in the fan rotor with the control means 34 upstream of the fan shaft 21. The trunnion 59 is attached downstream of the support ring 25 on the one hand and upstream of the fan shaft on the other hand. It is understood that the control means is located axially upstream of the trunnion. The difference with the other turbomachine fan (see FIGS. 1, 2 and 3) is that the upstream fan 400a is not ducted. The downstream fan 400b is attached to a fixed casing (which may be the inter-vein casing 16). The downstream fan 400b comprises blades 401 which are variable-pitch. A pitch-varying system (not shown) is provided to change the pitch of these blades. The blades extend radially across the secondary vein 15 arranged around the gas generator. The blades 401 are arranged axially downstream of the moving blades. The blades of the downstream fan 400b are not ducted either. Furthermore, the blades of the fixed downstream fan have a length substantially along the radial axis which is less than that of the upstream moving fan.

The invention claimed is:

1. A fan module comprising variable-pitch blades, said fan module comprising:
   a fan rotor carrying the variable-pitch blades of the fan, each variable-pitch blade is mounted to pivot about a pitch axis,
   a fan shaft extending along a longitudinal axis X inside the fan rotor and driving the fan rotor in rotation,
   a power shaft driving the fan shaft in rotation by means of an epicyclic gear speed reducer,
   at least a first and a second bearing for guiding the rotation of the fan rotor relative to a structure of the fan module, said at least a first and a second bearing being housed inside a lubrication enclosure, and
   a pitch-varying system for varying the pitch of the variable-pitch blades of the fan comprising a connector connected to the variable-pitch blades of the fan and a controller acting on the connector,
   wherein the first bearing is disposed upstream of the speed reducer and the second bearing is disposed downstream of the speed reducer, the fan rotor being connected to the fan shaft by means of an annular trunnion extending at least along an upstream part of the lubrication enclosure and the controller being located axially upstream of the trunnion.

2. The fan module according to claim 1, wherein said variable-pitch blade comprising roots and the annular trunnion extends below said roots along a radial axis.

3. The fan module according to claim 1, wherein the annular trunnion comprises an upstream end located axially at the level of the pitch axis of the variable-pitch blades and extends downstream of the pitch axis of the variable-pitch blades.

4. The fan module according to claim 1, wherein the fan rotor comprises a support ring comprising radial cylindrical housings distributed regularly around the longitudinal axis, each radial cylindrical housing intended to receive a blade root of the variable-pitch blades, the trunnion being fixed downstream of the support ring.

5. The fan module according to claim 1, wherein the controller is arranged upstream of a radial plane in which the pitch axes of the variable-pitch blades are defined.

6. The fan module according to claim 1, wherein the controller is rotationally secured with the fan shaft.

7. The fan module according to claim 1, wherein the controller comprises a fixed body secured with the fan shaft and a movable body that is movable in translation along the longitudinal axis X with respect to said fixed body, the movable body being connected to the connector.

8. The fan module according to claim 1, wherein the speed reducer comprises a sun gear coupled to the power shaft, planet gears and a planet carrier which carries the planet gears and which is coupled to the fan shaft.

9. The fan module according to claim 1, wherein the fan shaft and a planet carrier are integral.

10. The fan module according to claim 1, wherein the fan module comprises supplying means for supplying the control controller, said supplying means being connected to a power source, the supplying means comprising pipes which pass through the speed reducer and extend at least in part inside the fan shaft.

11. The fan module according to claim 1, wherein the speed reducer comprises through-openings which are provided in a planet carrier so as to allow the passage of pipes, each through-opening being arranged between two adjacent planet gears.

12. The fan module according to claim 1, wherein supplying means are coupled to an oil transfer bearing arranged downstream of the speed reducer.

13. The fan module according to claim 1, wherein the first bearing comprises two ball bearings or one roller bearing and one ball bearing.

14. The fan module according to claim 1, wherein the first bearing is a ball bearing.

15. The fan module according to claim 1, wherein the second bearing comprises a roller bearing.

* * * * *